United States Patent [19]

Haugen et al.

[11] Patent Number: 5,061,000

[45] Date of Patent: Oct. 29, 1991

[54] RACK FOR PICKUP TRUCK

[75] Inventors: Ronald E. Haugen; David T. Murphy, both of Forest City, Iowa

[73] Assignee: VIX Design Products, Inc., Forest City, Iowa

[21] Appl. No.: 522,907

[22] Filed: May 14, 1990

Related U.S. Application Data

[63] Continuation-in-part of Ser. No. 453,498, Dec. 20, 1989.

[51] Int. Cl.$^5$ ................ B62D 33/00; F16B 13/12; F16L 21/06
[52] U.S. Cl. .................................. 296/3; 403/297; 285/404; 285/419
[58] Field of Search ............. 296/3, 205; 403/292, 403/297, 298; 285/331, 404, 419

[56] References Cited

U.S. PATENT DOCUMENTS

| 2,947,566 | 8/1960 | Tower | 296/10 |
| 3,594,035 | 7/1971 | Ferguson | 296/3 |
| 4,211,448 | 7/1980 | Weston | 296/3 |
| 4,278,175 | 7/1981 | Jackson | 224/42.45 R |
| 4,344,719 | 8/1982 | Thom | 403/297 |
| 4,405,170 | 9/1983 | Raya | 296/10 |
| 4,636,106 | 1/1987 | Waisbrod | 403/298 X |
| 4,659,131 | 4/1987 | Flournoy, Jr. | 296/4 |
| 4,779,916 | 10/1988 | Christie | 296/3 |

FOREIGN PATENT DOCUMENTS 1906014  8/1969  Fed. Rep. of Germany ...... 403/297

Primary Examiner—Margaret A. Focarino
Assistant Examiner—Andrew C. Pike
Attorney, Agent, or Firm—Burd, Bartz & Gutenkauf

[57] ABSTRACT

An expandable joiner is used to secure tubular frame members of a pickup truck box rack in end-to-end relationship. The joiner is adaped to be located in adjacent end sections of the tubular members. The joiner has a longitudinal channel separating a pair of jaws. The jaws have adjacent spaced surfaces providing the longitudinal channel. Each spaced surface has a plurality of longitudinal grooves therein. Screws threadably engage the jaws longitudinal grooves to expand the joiner to releasably couple the frame members in end-to-end relationship.

20 Claims, 2 Drawing Sheets

RACK FOR PICKUP TRUCK

CROSS REFERENCE TO RELATED APPLICATION

This application is a continuation-in-part of U.S. Pat. application Ser. No. 453,498 filed Dec. 20, 1989.

FIELD OF THE INVENTION

The invention relates to racks for pickup trucks and joiner assemblies for racks adapted to be mounted on the boxes of pickup trucks. The joiners secure tubular frame members of a pickup truck rack in end-to-end relationship.

BACKGROUND OF THE INVENTION

Prior racks have been adapted for installation on the cargo box of a pickup truck for utility purposes. These pickup truck racks have upright members secured to the side wall of the truck box that support longitudinal members and cross members extending between the tops of the upright members. Examples of these pickup truck racks are disclosed in U.S. Pat. No. 2,947,566, issued Aug. 2, 1960, to P. Tower, and U.S. Pat. No. 4,405,170, issued Sept. 20, 1983, to R. Raya. These racks have telescoping tubular frame members that lock together.

Joiner devices interconnect the tubular frame members. An example of a joiner device is disclosed in U.S. Pat. No. 2,947,566, issued Aug. 2, 1960, to P. Tower. This joiner device is an elongated tube telescoped over adjacent ends of the frame members of a pickup truck. Nut and bolt assemblies are used to connect the joiner device to the adjacent frame members.

A majority of prior pickup truck racks have been difficult to install, cumbersome to remove, and expensive to construct. Further, these racks have interfered with the use of and accessibility to the box area of the truck. Oftentimes, the truck driver's view through the rear window of the truck is obstructed by the racks.

The prior joiner devices for pickup truck racks have been difficult to use, cumbersome to remove, and expensive to construct. Further, these joiner devices have exposed parts that may interfere with the use of the rack. These joiner devices are also susceptible to exposure damage, and wear.

SUMMARY OF THE INVENTION

The invention is directed to an expandable joiner for releasably securing frame members of a rack in end-to-end relationship. The joiner is adapted to be located within adjacent end sections of the frame members. This protects the joiner from exposure damage. The frame members can be joined to form a smooth, continuous surface. The joiner allows the rack to be easily assembled and disassembled.

The preferred embodiment of the joiner of the invention cooperates with adjacent end sections of frame members of a rack for a pickup truck to secure the members in end-to-end relationship. The joiner comprises a one-piece expandable split sleeve or tubular member having a longitudinal bottom slot, opening or channel adjacent a pair of oppositely disposed jaws. Tapered threaded members, such as screws, are threaded through the end sections into the channel to engage the jaws. The jaws have outer thread-like or grooved surfaces that cooperate with the screw to hold the screw in the channel and spread the jaws. This causes the joiner to expand increasing its outer diameter. Other expanders means can be used to expand the joiner. The joiner has a plurality of outwardly projecting ridges that engage the inner surfaces of the end sections when the joiner is expanded. The ridges are circumferentially spaced on the outer surface of the joiner. Each ridge has a plurality of outwardly directed teeth that bite into the inner surfaces of the frame members to prevent the separation of the joiner from the frame members thereby securing the frame members in end-to-end relationship. The joiner allows easy assembly and disassembly of the rack members.

These and other advantages of the joiner of the invention are shown in the drawing and described in the following detailed description.

DESCRIPTION OF THE PREFERRED EMBODIMENT

Figure 1:
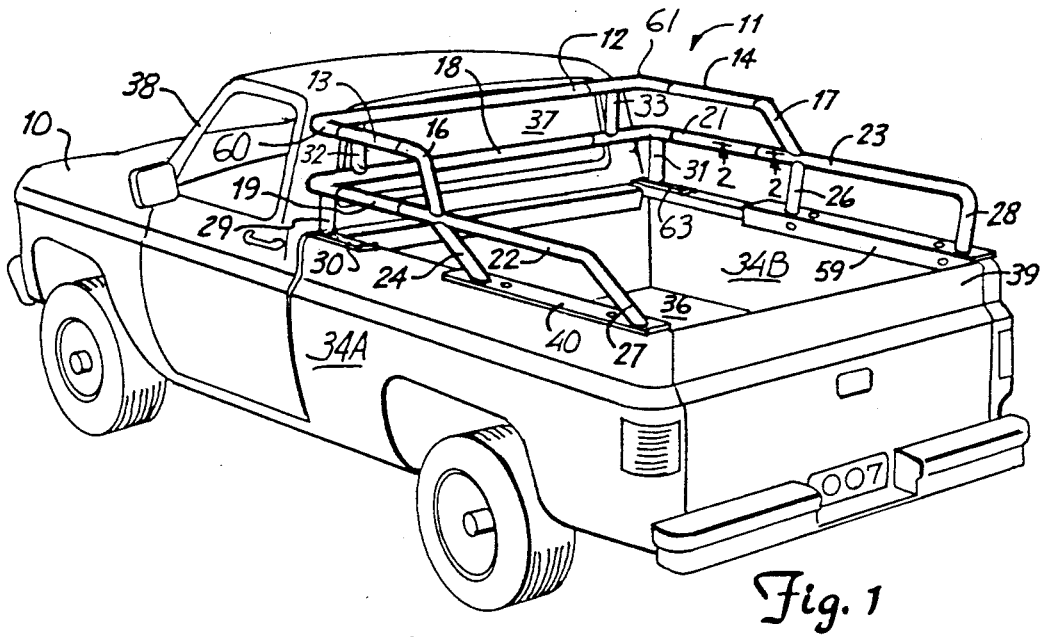
FIG. 1 is a perspective view of a rack mounted on the box of a pickup truck.

Referring to FIG. 1, there is shown a rack indicated generally at 11 mounted on the box of a pickup truck 10. Rack 11 consists of a plurality of tubular frame members, such as metal or plastic tubes, that are easily assembled and disassembled. For example, the frame members can be cylindrical metal pipes. Other shaped pipes, such as square or hexagonal, can be used as frame members for pickup truck racks. The inner diameters and the outer diameters of the tubular frame members of rack 11 are substantially the same. The tubular members can have differing inner and outer diameters. One type of rack 11 is made of light weight tail pipe tubes of quality material that is easily broken down and shipped in a box. For example, rack 11 can fit into a shipping box, twelve by twelve by fifty inches, and weighs less than seventy pounds. The sides of rack 11 are tapered upwardly and outwardly to enable a tool box with its covers (not shown) to fit in the front part of truck bed 36. Rack 11 does not provide any obstruction of the load area of truck bed 36 nor obstruct driver viewing through rear window 37 of cab 38 of the truck. The lateral width of rack 11 is adjustable to fit different sized boxes of pickup trucks.

Rack 11 has a generally straight upper rail 12 and a generally straight lower rail 18 that extend horizontally across the front area of truck box 39. Opposite ends of rails 12 and 18 are connected to corner units 60 and 61 with joiners hereinafter described. The lengths of rails 12 and 18 can vary to accommodate different sized truck boxes. The same joiner is used to connect all the adjacent rails and corner units 60 and 61 together. Each corner unit has a pair of right angle tubes connected together with upright members or posts 32 and 33.

Corner unit 60 has a downwardly directed leg 29 secured to a foot or plate 30. Fasteners, such as bolts, (not shown) attach plate 30 to the top of the side wall 34A of box 39. Corner unit 61 has a downwardly directed leg 31. The lower end of leg 31 is secured to a foot or plate 63. Fasteners, such as bolts, (not shown) attach plate 63 to the top of box side wall 34B adjacent cab 38. Upper rail 12 and lower rail 18 are positioned generally parallel to each other above the front area of truck box 39. Upright members 32 and 33 vertically space rails 12 and 18 so that the view through rear window 37 is not obstructed.

A first pair of tubular side rails 13 and 14 are joined in an end-to-end relationship to opposite ends of corner units 60 and 61 with joiners hereinafter described. Side rails 13 and 14 have substantially the same inner and outer diameters as the inner and outer diameters of upper right angle tubes of corner units 60 and 61. The opposite ends of upper rail 12 are located generally above the top of the front wall of truck box 39. A second pair of tubular side rails 19 and 21 are connected in end-to-end relationship to opposite ends of lower right angle tubes of corner units 60 and 61 with joiners hereinafter described. The length of each side rail 19 and 21 is substantially the same as the length of each side rail 13 and 14. The inner and outer diameters of side rails 19 and 21 and opposite ends of lower right angle tubes of corner units 60 and 61 are substantially the same. The opposite ends of lower right angle tubes of corner units 60 and 61 are turned rearwardly and positioned outwardly from and above the outer surface of side walls 34A and 34B thereby locating side rails 19 and 21 above and outwardly from side walls 34A and 34B. This allows a tool box with its covers (not shown) to fit in the front area of truck bed 36.

Tubular end rails 22 and 23 are coupled in an end-to-end relationship to side rails 19 and 21 with joiners hereinafter described. End rails 22 and 23 and side rails 19 and 21 have substantially the same inner and outer diameters. Upwardly and outwardly inclined tubular legs 24 and 27 extend between truck side wall 34A and end rail 22 to hold end rail 22 in linear alignment with side rail 19. A first elongated angle plate or support 40 is secured to the lower ends of legs 24 and 27 and the top of side wall 34A with a plurality of fasteners or bolts. End rail 22 is located upwardly and outwardly from the outer surface of left side wall 34A of the truck box. Similarly, tubular legs 26 and 28 angle upwardly and outwardly between side wall 34B and end rail 23 to support end rail 23 in linear alignment with side rail 21. This positions end rail 23 above and outwardly from right side wall 34B of the truck box. A second elongated angle plate or support 59 is secured by welds or the like to the lower ends of legs 26 and 28. A plurality of fasteners, such as bolts, attach angle plate 59 to the top of one side wall 34B of the truck box. End rails 22 and 23 do not interfere with the opening of tool boxes and the like located in truck box 39. Inclined tubular L-shaped arms 16 and 17 extending upwardly and inwardly from end rails 22 and 23 are joined to side rails 13 and 14, respectively. The front end sections of arms 16 and 17 are coupled with joiners hereinafter described in an end-to-end relationship with side rails 13 and 14.

Referring to FIGS. 2 to 7, there is shown a joiner, indicated generally at 41, used to releasably couple adjacent end sections of corner units and tubular frame members or rails of rack 11 in end-to-end relationship. Joiner 41 enables rack 11 to be easily assembled and disassembled. The following description is directed to joiner 41 used to secure adjacent end sections of side rail 21 and end rail 23 in end-to-end relationship. The structure and function of the joiners used to connect adjacent end sections of rails 12, 13, 14, 16, 17, 18, 19, 21, 22, and 23 and corner units 60 and 61 are identical to joiner 41.

Figure 6:
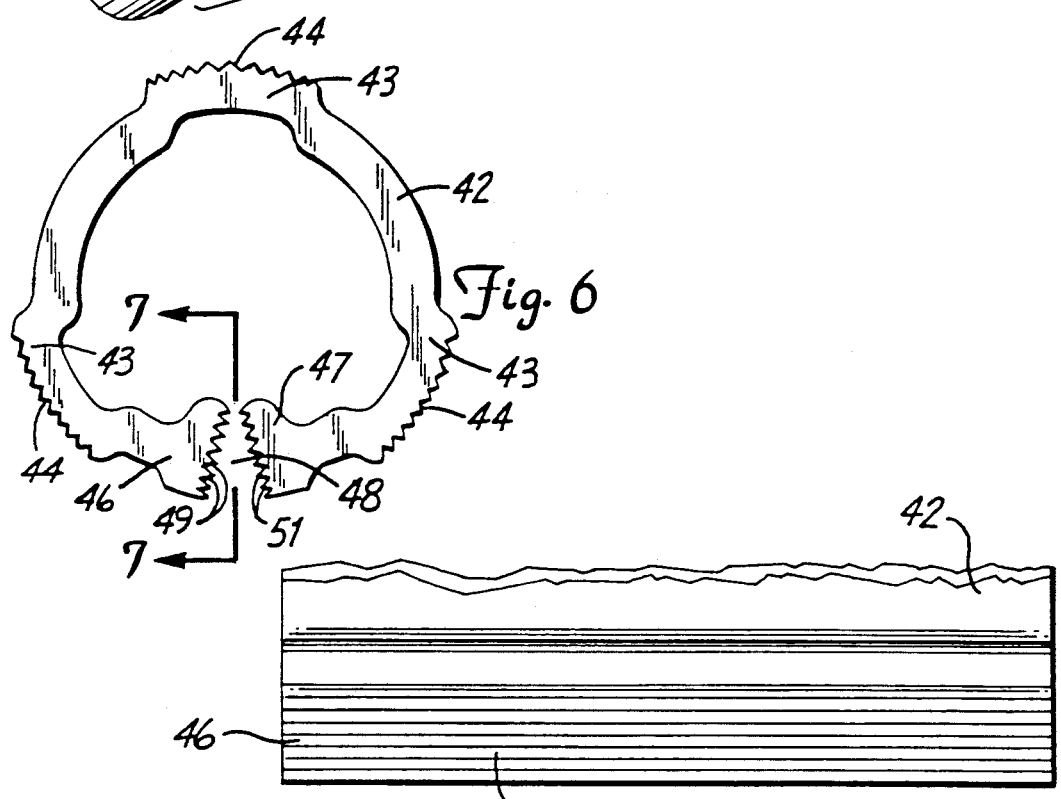
FIG. 6 is an enlarged end view of the joiner.
Figure 7:
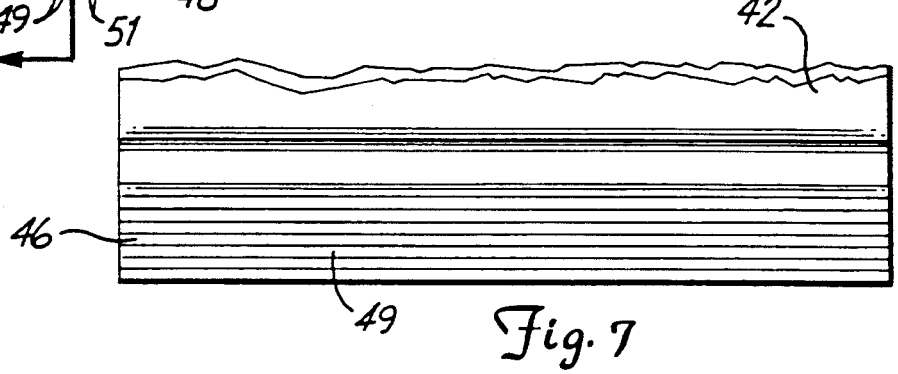
FIG. 7 is a sectional view taken along line 7—7 of FIG. 6.

As shown in FIG. 6, joiner 41 is a generally tubular insert or slit sleeve 42 having a plurality of outwardly projecting ridges 43. Ridges 43 are circumferentially spaced apart about 120 degrees from each other on the outer surface of insert 42. The outer surface of each ridge 43 has a plurality of teeth 44 adapted to engage and bite into the inner surfaces of side rail 21 and end rail 23. Insert 42 has a bottom opening or channel 48 that extends longitudinally between a pair of oppositely disposed jaws 46 and 47. Channel 48 and jaws 46 and 47 extend longitudinally along the length of the bottom of insert 42. The surfaces of jaws 46 and 47 adjacent channel 48 have longitudinal grooves or threads 49 and 51, respectively.

Figure 5:
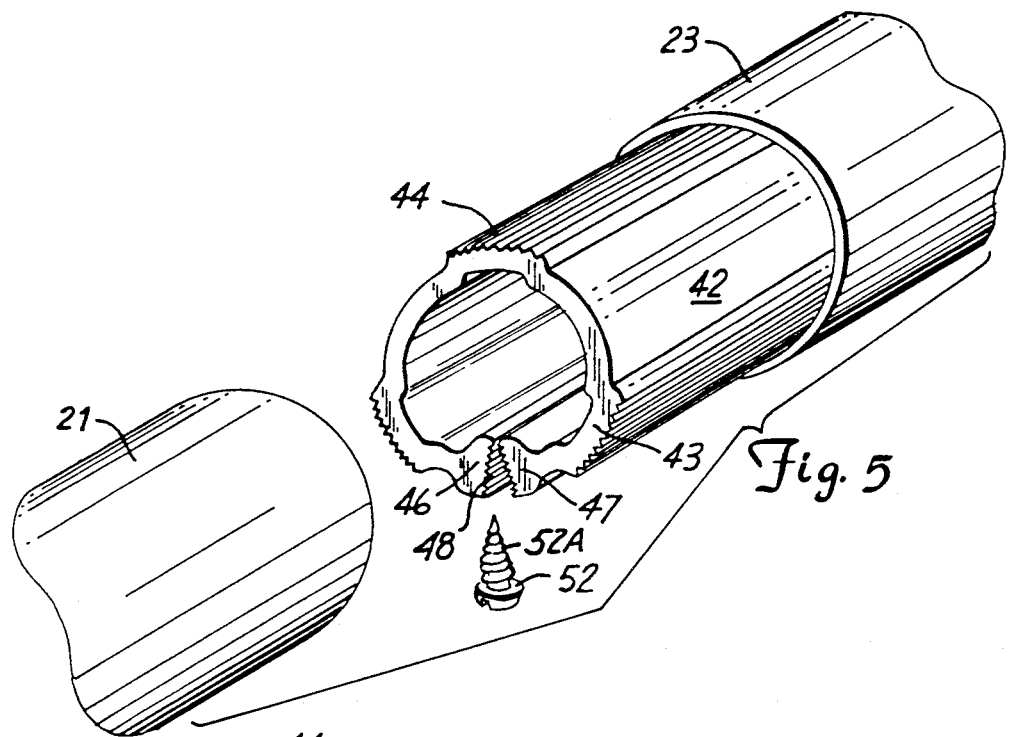
FIG. 5 is an exploded perspective view of adjacent end sections of tubular members and the joiner for locking the tubular members in end-to-end relationship.

Returning to FIGS. 2, 3, and 4, insert 42 is located in passages 21A and 23A of adjacent end sections of side rail 21 and end rail 23. Tapered threaded members, such as screws 52 and 53, projecting inwardly through holes 54 and 56 provided in rails 21 and 23 are located in channel 48 to hold teeth 44 of ridges 43 in tight fitting engagement with the inner surfaces of rails 21 and 23. As seen in FIG. 5, screw 52 has a converging tapered threaded body 52A larger than slot 48 so that when screw 52 is turned up between jaws 46 and 47, they are wedged apart by the tapered body 52A. The external threads of screws 52 and 53 engage threads 49 and 51 of jaws 46 and 47 to secure the screws to the insert. Screws 52 and 53 spread jaws 46 and 47 as shown by the arrows in FIG. 3 to force teeth 44 to bite into rails 21 and 23 to firmly secure the rails in end-to-end relationship. Screws 52 and 53 are insert expanders that cause the insert 42 to tightly grip adjacent rails 21 and 23.

Figure 2:
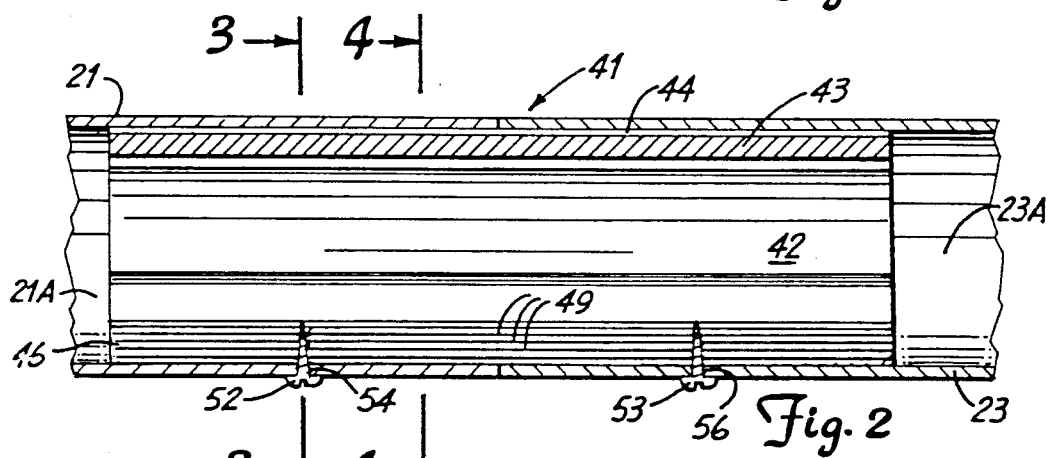
FIG. 2 is an enlarged sectional view taken along line 2—2 of FIG. 1.
Figure 3:
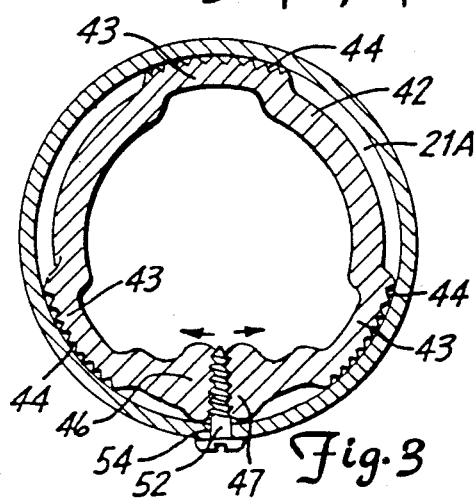
FIG. 3 is an enlarged sectional view taken along line 3—3 of FIG. 2.
Figure 4:
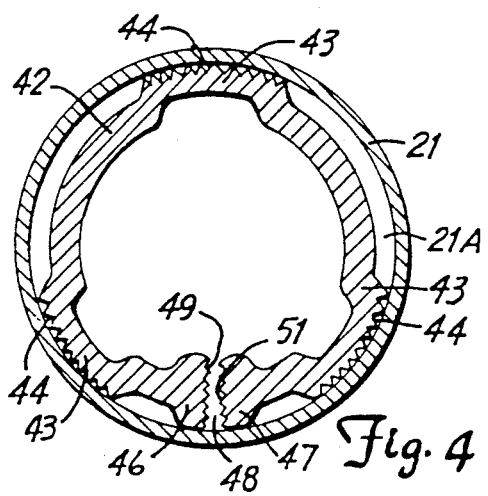
FIG. 4 is an enlarged sectional view taken along line 4—4 of FIG. 2.

In use, insert 42 is positioned into passages 21A and 23A of side rail 21 and end rail 23. The outer diameter of insert 42 is slightly less than the diameters of passages 21A and 23A whereby insert 42 can easily fit into the passages. Teeth 44 of ridges 43 are located adjacent the inner surfaces of rails 21 and 23. The adjacent outer ends of rails 21 and 23 are moved into engagement, as shown in FIG. 2. Preferably, insert 42 is positioned in passages 21A and 23A so that approximately half of the insert is located in passage 21A and the other half of the insert is located in passage 23A. The longitudinal position of the insert within the passages of the adjacent end sections is adjustable. For example, the insert may be located in the passages of the rails so that approximately three-fourths of the insert is located in one passage and one-fourth of the insert is located in the other passage. This allows end-to-end coupling of rails having differing configurations, such as upper right angle tube of corner unit 61 to side rail 14.

To secure side rail 21 and end rail 23 in end-to-end relationship, holes 54 and 56 provided in rails 21 and 23 are aligned with channel 48 of insert 42. Screws 52 and 53 are threaded through holes 54 and 56 into channel 48. The shafts or bodies of screws 52 and 53 engage threads 49 and 51 thereby expanding insert 42 by increasing the separation distance between jaws 46 and 47. This causes the outer diameter of insert 42 to expand so that teeth 44 are moved into gripping relationship with the inner surfaces of rails 21 and 23. This securely locks rails 21 and 23 in end-to-end relationship.

To disassemble side rail 21 from end rail 23, screws 52 and 53 are removed from channel 48 and holes 54 and 56. The memory of the material of insert 42 allows jaws 46 and 47 to move toward each other causing the outer diameter of insert 42 to decrease and move teeth 44 out of engagement with the inner surfaces of rails 21 and 23. Side rail 21 can then be separated from end rail 23 and insert 42.

Joiner 41 is a relatively inexpensive connector usable with a variety of tubular rack frameworks. Joiner 41 allows for easy assembly and disassembly of the members of rack assembly 11. Joiner 41 is adapted to releasably couple various shaped tubular members in end-to-end relationship.

While there is shown and described one embodiment of the joiner of the invention, it is understood that changes in the structure and arrangement of structure can be made by those skilled in the art without departing from the invention. The invention is defined in the following claims.

We claim:

1. A rack adapted to be mounted on a box of a pickup truck comprising: a plurality of frame members including a first corner unit having first tubular members and first upright means for supporting the first corner unit on a first top section of the box, a second corner unit having second tubular members and second upright means for supporting the second corner unit on a second top section of the box, transverse tubular means connected to each corner unit, a pair of first tubular side members secured to the first tubular members, a pair of second tubular side members secured to the second tubular members, a first tubular end member secured to the first side members opposite the first corner unit, the first end member having first arm means secured to one of the first side members opposite the first corner unit, a second tubular end member secured to the second side members opposite the second corner unit, the second end member having second arm means secured to one of the second side members opposite the second corner unit, and leg means for supporting the end members on the box; joiner means cooperating with adjacent end sections of the frame members to secure the frame members in end-to-end relationship, said joiner means comprising at least one expandable insert means having a longitudinal opening located within the adjacent end sections of the frame members, the insert means having first and second jaws on opposite sides of the longitudinal opening, the first and second jaws having adjacent spaced surfaces providing said longitudinal opening, each spaced surface having longitudinal grooves therein; and expander means mounted on the adjacent end sections of the frame members and extended into the opening in the insert means, said expander means comprising tapered threaded means extended through the adjacent end sections of the frame members engageable with the longitudinal grooves to expand the insert means into tight engagement with the adjacent end sections of the frame members.

2. The rack of claim 1 wherein: the insert means has an expandable circumferential size, said tapered threaded means being engageable with said longitudinal grooves to increase the circumferential size of the insert means thereby circumferentially expanding the insert means into tight engagement with the adjacent end sections of the frame members.

3. The rack of claim 1 wherein: the insert means has a plurality of outwardly directed ridges located in gripping engagement with the adjacent end sections of the frame members when the insert means is expanded by the tapered threaded means.

4. The rack of claim 3 wherein: each ridge has a plurality of outwardly directed teeth extended in biting engagement with the adjacent end sections of the frame members when the insert means is expanded by the tapered threaded means.

5. A rack for a box of a pickup truck comprising: a pair of front tubes, means supporting the front tubes on a front area of the box of the truck, a plurality of upper and lower elongated side tubes joined to the means supporting the front tubes, a plurality of end tubes secured to the lower side tubes in end-to-end relationship, joiner means securing adjacent end sections of the front tubes, side tubes, end tubes, and means supporting the front tubes in end-to-end relationship, means supporting the end tubes on the box, said joiner means comprising at least one expandable insert means having a longitudinal slot located within the adjacent end sections, the insert means having first and second jaws on opposite sides of the longitudinal slot, the first and second jaws having adjacent spaced surfaces providing said longitudinal slot, each spaced surface having longitudinal grooves therein, and expander means mounted on the adjacent end sections and extended into the slot, said expander means comprising tapered threaded means extended through the adjacent end sections engageable with the longitudinal grooves to expand the insert means into tight engagement with the adjacent end sections.

6. The rack of claim 5 wherein: the insert means has an expandable circumferential size, said tapered threaded means being engageable with said longitudinal grooves to increase the circumferential size of the insert means thereby circumferentially expanding the insert means into tight engagement with the adjacent end sections.

7. The rack of claim 5 wherein: the insert means has a plurality of outwardly directed ridges located in gripping engagement with the adjacent end sections when the insert means is expanded by the tapered threaded means.

8. The rack of claim 7 wherein: each ridge has a plurality of outward directed teeth extended in biting engagement with the adjacent end sections when the insert means is expanded by the tapered threaded means.

9. An apparatus for coupling a first frame member to a second frame member, each frame member having an end section with a passage having an open end therein, the apparatus comprising: an expandable joiner means adapted to be located within the passages in the end sections of the first frame member and the second frame member, the joiner means having a pair of oppositely disposed jaws adjacent an elongated slot, the jaws having oppositely disposed spaced surfaces, each spaced surface having a plurality of longitudinal grooves therein, the joiner means having a selected circumferential size, and expansion means comprising at least one tapered threaded means threaded through one of the end sections adapted to be accommodated by the slot and engageable with the longitudinal grooves to expand the circumferential size of the joiner means thereby causing the joiner means to engage an inner surface of each end section of the frame members to releasably hold the first and second frame members in end-to-end relationship.

10. The apparatus of claim 9 wherein: the joiner means has a plurality of outwardly directed ridges engageable with the inner surfaces of the end sections of the frame members when the joiner means is expanded.

11. The apparatus of claim 10 wherein: each ridge has a plurality of outwardly projecting teeth adapted to bit into the inner surfaces of the end sections of the frame members.

12. The apparatus of claim 11 wherein: the ridges are circumferentially spaced on an outer surface of the joiner means.

13. The apparatus of claim 9 wherein: the joiner means is a generally tubular split sleeve.

14. An apparatus for securing first and second tubular members of a rack for a pickup truck in end-to-end relationship comprising: a generally tubular joiner having a selected size adapted to be located within a first end section of the first tubular member and a second end section of the second tubular member, said joiner having a longitudinal opening and a pair of oppositely disposed jaws adjacent the opening, the jaws having adjacent spaced surfaces providing said longitudinal opening, longitudinal grooves in said spaced surfaces, and expander means mountable on the first and second tubular members adapted to be located in the opening and engageable with the longitudinal grooves so as to increase the size of the joiner thereby causing the joiner to engage inner surfaces of the first and second end sections to releasably hold the first and second members in end-to-end relationship.

15. The apparatus of claim 14 wherein: the joiner has at least one outwardly projecting ridge, said ridge engaging the inner surfaces of the first and second end sections when the joiner is expanded.

16. The apparatus of claim 15 wherein: each ridge has a plurality of outwardly directed teeth extendable into biting engagement with the first and second end sections of the members.

17. The apparatus of claim 14 wherein: the size of the joiner is an expandable circumferential size, said expander means being engageable with said longitudinal grooves to increase the circumferential size of the joiner thereby circumferentially expanding the joiner into tight engagement with the first and second end sections of the members.

18. The apparatus of claim 17 wherein: said expander means comprises tapered threaded means extended through the end sections of the members into engagement with the longitudinal grooves to expand said joiner.

19. The apparatus of claim 18 wherein: the joiner has a plurality of outwardly directed ridges located in gripping engagement with the end sections of the members when the joiner is expanded by the tapered threaded means.

20. The apparatus of claim 19 wherein: each ridge has a plurality of outwardly directed teeth extended in biting engagement with the end sections of the members when the joiner is expanded by the tapered threaded means.

* * * * *